(12) United States Patent
Murashima et al.

(10) Patent No.: US 6,876,791 B2
(45) Date of Patent: Apr. 5, 2005

(54) DIFFRACTION GRATING DEVICE

(75) Inventors: Kiyotaka Murashima, Yokohama (JP); Ken Hashimoto, Yokohama (JP); Toru Iwashima, Yokohama (JP)

(73) Assignee: Sumitomo Electric Industries, Ltd., Osaka (JP)

( * ) Notice: Subject to any disclaimer, the term of this patent is extended or adjusted under 35 U.S.C. 154(b) by 111 days.

(21) Appl. No.: 10/184,105

(22) Filed: Jun. 28, 2002

(65) Prior Publication Data

US 2003/0044117 A1 Mar. 6, 2003

(30) Foreign Application Priority Data

Sep. 3, 2001 (JP) .................................... P2001-266191

(51) Int. Cl.$^7$ ............................................... G02B 6/34
(52) U.S. Cl. ........................................................ 385/37
(58) Field of Search .......................................... 385/37

(56) References Cited

U.S. PATENT DOCUMENTS

| 6,314,221 B1 | * | 11/2001 | Riant et al. .................... 385/37 |
| 6,490,078 B2 | * | 12/2002 | Enomoto et al. ......... 359/341.1 |
| 2003/0016912 A1 | * | 1/2003 | Riant et al. .................... 385/37 |

OTHER PUBLICATIONS

"Field Distributions Inside Fiber Gratings", Miguel A. Muriel, IEEE Journal of Quantum Electronics, vol. 35, No. 4, Apr. 1999, 548–558.

"Novel designs for sampled grating–based multiplexers–demultiplexers", W. H. Loh et al., Optic Letters, Nov. 1, 1999, vol. 24, No. 21, pp. 1457–1459.

"Dispersion Compensating Multi–Channel FBG with Low Radiation Mode Losses", Kiyotaka Murashima et al., OECC / IOOC 2001 Conference Incorporating ACOFT.

* cited by examiner

*Primary Examiner*—Mark Tremblay
(74) *Attorney, Agent, or Firm*—McDermott Will & Emery LLP

(57) ABSTRACT

In a diffraction grating device (1), index modulations are formed along the longitudinal direction of an optical fiber (10) serving as an optical waveguide. The optical fiber (10) has a core region (11), an inner cladding region (12), and an outer cladding region (13) sequentially from the optical axis center. Index modulations are formed in both the core region (11) and the inner cladding region (12) of the optical fiber (10) in each of a plurality of regions $A_1$ to $A_N$ (N is an integer; $N \geq 2$) separated from each other along the longitudinal direction of the optical fiber (10). In the diffraction grating device (1), regions $A_n$ (n=1 to N) in which index modulations are formed in both the core region (11) and the inner cladding region (12) and regions $B_n$ (n=1 to N–1) in which no index modulations are formed alternately exist along the longitudinal direction.

8 Claims, 9 Drawing Sheets

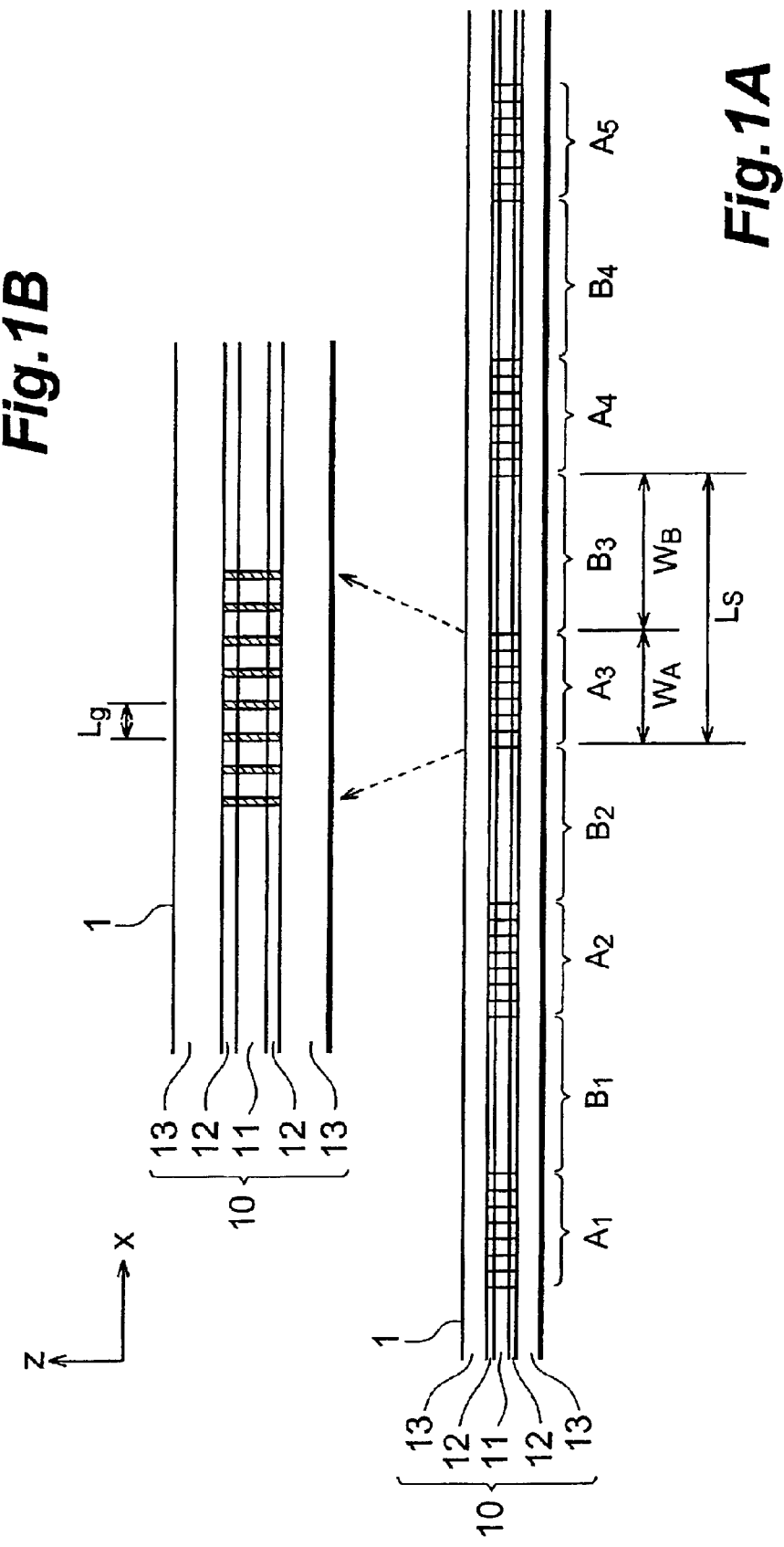

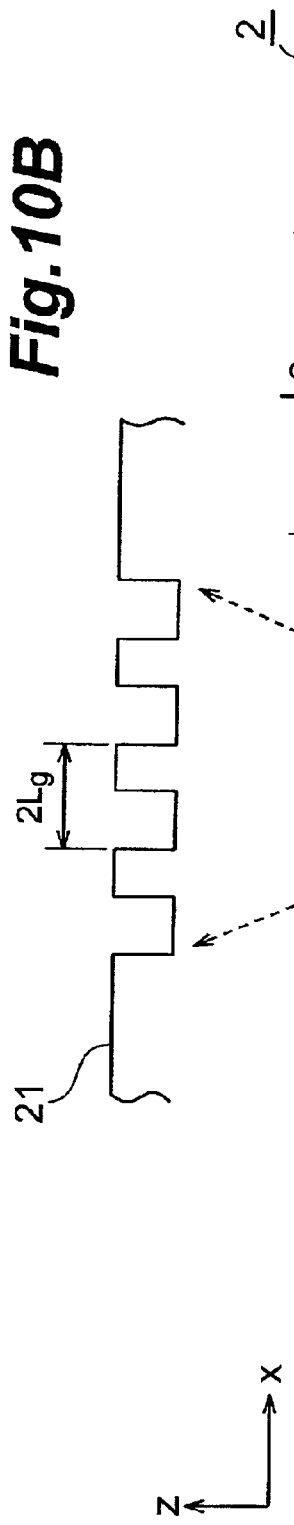

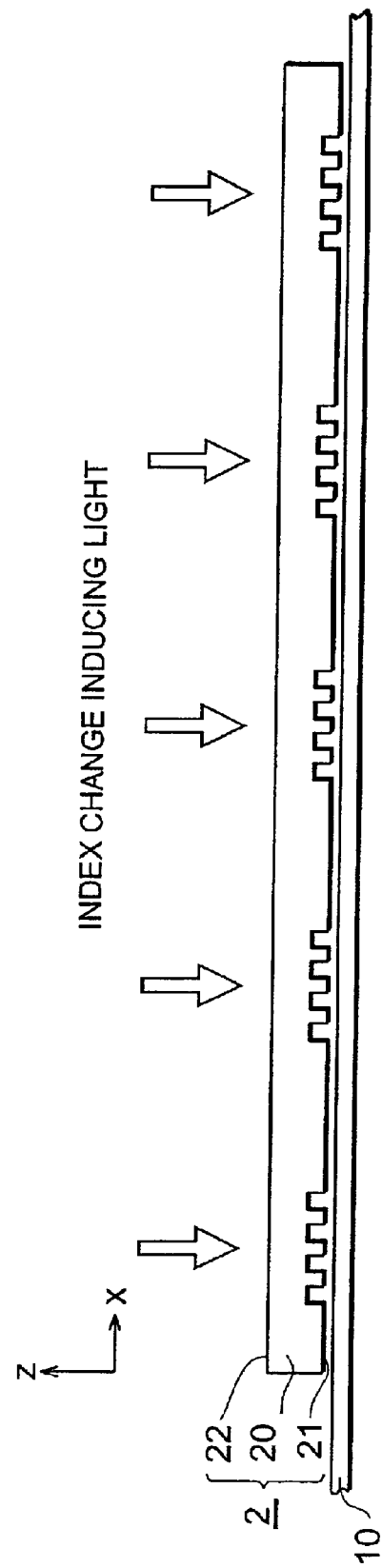

DIFFRACTION GRATING DEVICE

BACKGROUND OF THE INVENTION

1. Field of the Invention

The present invention relates to a diffraction grating device in which index modulations are formed along the longitudinal direction of an optical waveguide.

2. Related Background Art

A diffraction grating device has index modulations formed in the longitudinal direction of an optical waveguide (optical fiber or planar optical waveguide). Especially, a diffraction grating device in which Bragg type index modulations are formed can selectively reflect, out of guided light components, a light component having a specific wavelength that satisfies the Bragg condition, and is therefore used as an optical filter or the like in an optical communication system. Such a diffraction grating device is manufactured by the two-beam interference method or phase grating method. In such a diffraction grating device, normally, index modulations having a predetermined period are formed in one region along the longitudinal direction of an optical waveguide. The diffraction grating device has only one reflection wavelength that satisfies the Bragg condition in accordance with the index modulation period.

On the other hand, a diffraction grating device having a plurality of reflection wavelengths has been proposed. For example, a diffraction grating device described in, e.g., M. A. Muriel, et al., "Field Distributions Inside Fiber Gratings", IEEE Journal of Quantum Electronics, Vol. 35, No. 4, pp. 548–558 (1999) has index modulations formed in the core region of an optical waveguide in each of a plurality of regions separated from each other along the longitudinal direction of the optical waveguide. The diffraction grating device has a number of reflection wavelengths corresponding to the arrangement period (to be referred to as a "sampling period" hereinafter) of the plurality of regions.

SUMMARY OF THE INVENTION

The present inventors examined the above-described prior art and found the following problems. The above diffraction grating device has the character of a Bragg grating device that Bragg-reflects light with a specific wavelength satisfying the Bragg condition because the period of index modulations in each of the plurality of regions is short. On the other hand, the diffraction grating device also has the character of a long-period grating device which inflicts a loss on light having a specific wavelength using the phase matching condition between core-mode light and cladding-mode light because the sampling period is about several hundred $\mu$m.

To efficiently reflect light containing a number of reflection wavelengths, the diffraction grating device must shorten the longitudinal length of each of the plurality of regions in which index modulations are formed and also increase the amplitude of index modulations in each of the plurality of regions. However, if the amplitude of index modulations in each of the plurality of regions is large, light radiation from the core region to the cladding region increases, resulting in a large radiation mode loss. Additionally, since the diffraction grating device has the character of a long-period grating device, a transmission loss is generated by optical coupling between core-mode light and cladding-mode light.

The present invention has been made to solve the above problems and has as its object to provide a diffraction grating device capable of suppressing both a radiation mode loss and a transmission loss due to intermode optical coupling.

According to the present invention, there is provided a diffraction grating device in which index modulations are formed along a longitudinal direction of an optical waveguide, wherein the optical waveguide has a core region, an inner cladding region, and an outer cladding region sequentially from an optical axis center, and index modulations are formed in both the core region and the inner cladding region of the optical waveguide in each of a plurality of regions separated from each other along the longitudinal direction of the optical waveguide.

In the diffraction grating device, out of core-mode light that is guided through the optical waveguide to reach a region where index modulations are formed, a core-mode light component having a specific wavelength that satisfies the Bragg condition is Bragg-reflected. In addition, a cladding-mode light component having a wavelength whose frequency difference from that wavelength is an integer multiple of a predetermined value is also reflected. For coupling with backward cladding-mode light, the light is reflected in both the core region and the inner cladding region in which index modulations are formed. Accordingly, light radiation from the core region to the outer cladding region is reduced. On the other hand, for coupling with forward cladding-mode light, a change in index difference between the core region and the inner cladding region is suppressed in the regions where index modulations are formed and the remaining regions, mode conversion is suppressed. Hence, light radiation from the core region to the outer cladding region is reduced.

In the diffraction grating device according to the present invention, in each of the plurality of regions, a ratio of a difference between a change amount of a refractive index in the core region and a change amount of a refractive index in the inner cladding region due to formation of the index modulations to the change amount of the refractive index in the core region is preferably not more than 12.5%. Alternatively, when a difference between a refractive index in the core region in the plurality of regions and a refractive index in the core region outside the plurality of regions is defined as a core index difference, and a difference between a refractive index in the inner cladding region in the plurality of regions and a refractive index in the inner cladding region outside the plurality of regions is defined as an inner cladding index difference, a ratio of a difference between the core index difference and the inner cladding index difference to the core index difference is preferably not more than 12.5%. With this arrangement, coupling with another mode can be suppressed to 5% or less, as compared to a single-mode fiber.

The ratio is preferably not more than 10%, and more preferably not more than 5%. With this arrangement, coupling with another mode can be suppressed to 3% or less, or 1% or less, as compared to a single-mode fiber.

In the optical waveguide type diffraction grating device according to the present invention, a radial size of the inner cladding region is preferably not less than 16 $\mu$m.

The present invention can sufficiently be understood by reference to the following detailed description when considered in connection with the accompanying drawings. These are mere examples and do not limit the present invention.

BRIEF DESCRIPTION OF THE DRAWINGS

FIG. 1A is a sectional view of a diffraction grating device according to the embodiment;

FIG. 1B is an enlarged view of part of FIG. 1A;

FIG. 10A is a side view of the phase grating mask used in manufacturing the diffraction grating device according to this embodiment;

FIG. 10B is an enlarged view of part of FIG. 10A;

FIG. 11 is an explanatory view of a method of manufacturing the diffraction grating device 1 according to this embodiment.

DESCRIPTION OF THE PREFERRED EMBODIMENT

Figure 2A:
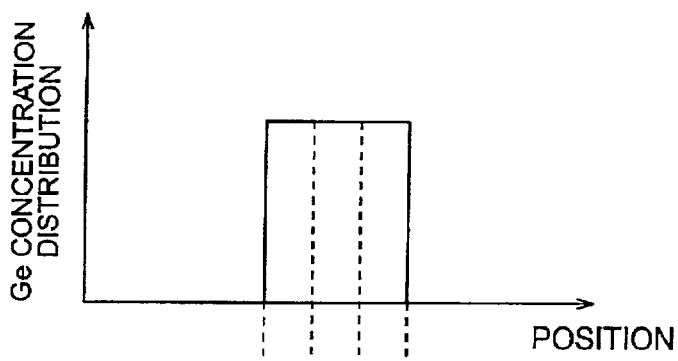
FIGS. 2A to 2D are explanatory views of the optical fiber of the diffraction grating device.

The embodiment of the present invention will be described below in detail with reference to the accompanying drawings. The same reference numerals denote the same elements throughout the drawings, and a repetitive description thereof will be omitted. For the descriptive convenience, orthogonal coordinate systems are illustrated in the figures.

FIG. 1A is a sectional view of a diffraction grating device 1 according to this embodiment. FIG. 1B is an enlarged view of part of FIG. 1A. FIG. 1A shows a section of the diffraction grating device 1 taken along a plane including the optical axis of the diffraction grating device 1.

In the diffraction grating device 1, index modulations are formed along the longitudinal direction (X-axis direction) of an optical fiber 10 serving as an optical waveguide. The optical fiber 10 has a core region 11, inner cladding region 12, and outer cladding region 13 sequentially from the optical axis center. Index modulations are formed in both the core region 11 and the inner cladding region 12 of the optical fiber 10 in each of a plurality of regions $A_1$ to $A_N$ (N is an integer; N≧2) separated from each other along the longitudinal direction of the optical fiber 10. That is, in the diffraction grating device 1, regions $A_n$ (n=1 to N) in which index modulations are formed in both the core region 11 and the inner cladding region 12 and regions $B_n$ (n=1 to N−1) in which no index modulations are formed alternately exist along the longitudinal direction.

The regions $A_n$ (n=1 to N) may have the same or different widths $W_A$ in the X-axis direction. The regions $B_n$ (n=0 to N) may also have the same or different widths $W_B$ in the X-axis direction. The index modulations formed in the regions $A_n$ (n=1 to N) may also have the same or different periods $L_g$. For easy design and manufacturing, however, it is preferable that the regions $A_n$ (n=1 to N) have the same width $W_A$ in the X-axis direction, and the regions $B_n$ (n=0 to N) also have the same width $W_B$ in the X-axis direction. Note that the width $W_A$ is about 100 to 200 μm, the width $W_B$ is about 1 mm, and the number N of regions A having index modulations formed therein is about 50 to 100. For the illustrative convenience, N=5 in FIGS. 1A and 1B.

A sampling period $L_s$ of the diffraction grating device 1 is given by $$L_s = W_A + W_B \quad (1)$$

A Bragg wavelength $\lambda_{Bragg}$ is given by $$\lambda_{Bragg} = 2 \cdot n_{eff} \cdot L_g \quad (2)$$

A frequency interval Δf of reflection wavelengths is given by $$\Delta f = c/(2 \cdot n_{eff} \cdot L_s) \quad (3)$$

where c is the light speed in vacuum, and $n_{eff}$ is the effective refractive index of the optical fiber 10. More specifically, the diffraction grating device 1 is capable of not only Bragg-reflecting a light component having the wavelength $\lambda_{Bragg}$ out of light guided through the core region 11 but also reflecting any light component having a wavelength whose frequency difference from the wavelength $\lambda_{Bragg}$ is an integer multiple of Δf. That is, the diffraction grating device 1 has a plurality of reflection wavelengths.

Figure 2B:
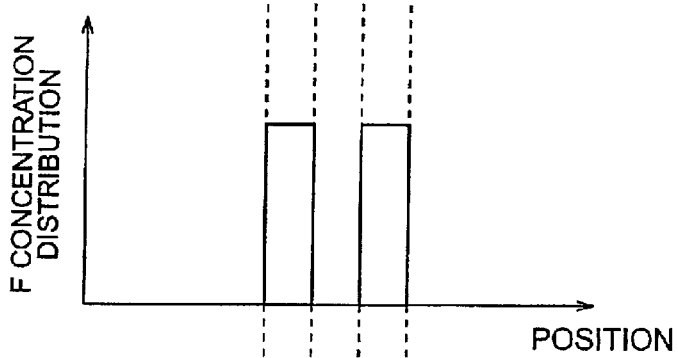
Figure 2C:
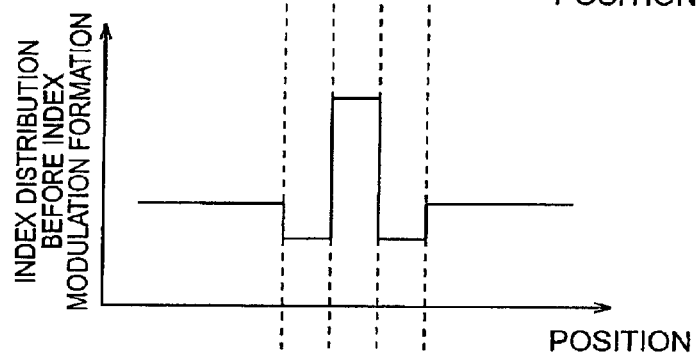
Figure 2D:
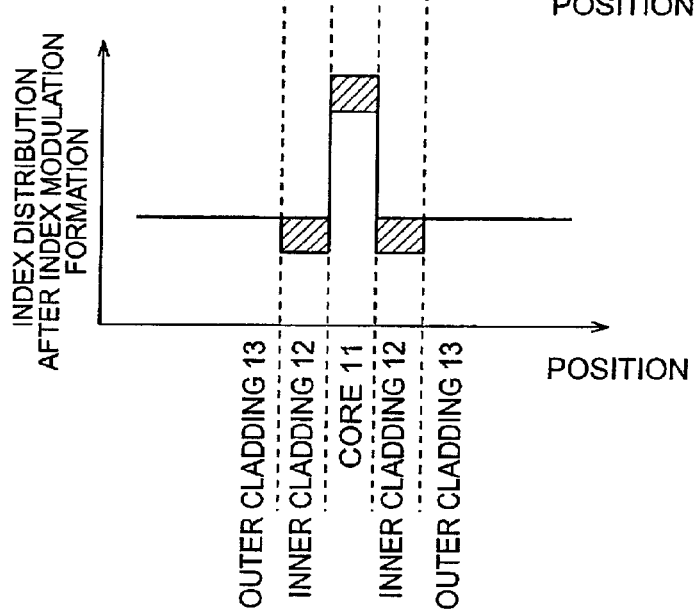

FIGS. 2A to 2D are explanatory views of the optical fiber 10 of the diffraction grating device 1. FIG. 2A shows the radial distribution of Ge concentration in the optical fiber 10. FIG. 2B shows the radial distribution of F concentration in the optical fiber 10. FIG. 2C shows the radial distribution of refractive indices in the optical fiber 10 before index modulation formation. FIG. 2D shows the radial distribution of average refractive indices in the optical fiber 10 after index modulation formation.

This optical fiber 10 is based on silica glass. $GeO_2$ is doped in both the core region 11 and the inner cladding region 12 (FIG. 2A). F element is doped in the inner cladding region 12 (FIG. 2B). Since the $GeO_2$ and F element are doped, the optical fiber 10 before index modulation formation has such a radial distribution that the refractive index in the core region 11 is highest, and that in the inner cladding region 12 is lowest (FIG. 2C). Note that the inner cladding region 12 preferably has such an outer diameter that the energy of core-mode light guided through the optical fiber 10 substantially exists in that range.

When index modulations are formed in the optical fiber 10, index modulations are formed in both the core region 11 and the inner cladding region 12 in which $GeO_2$ is doped. Accordingly, the average refractive indices in the core region 11 and inner cladding region 12 become high. In FIG. 2D, the increase amounts of the average refractive indices due to index modulation formation are indicated by hatching.

As shown in FIGS. 2C and 2D, since the change in index difference between the core region 11 and the inner cladding region 12 (before and after index modulation formation) is suppressed in the regions $A_n$ (n=1 to N) with the index modulations and the remaining regions $B_n$ (n=1 to N−1), mode conversion is suppressed.

In the diffraction grating device 1, out of core-mode light that is guided through the optical fiber 10 to reach the region $A_n$, a core-mode light component having the specific wavelength $\lambda_{Bragg}$ (equation (2)) that satisfies the Bragg condition is Bragg-reflected. In addition, a cladding-mode light component having a wavelength whose frequency difference from the wavelength $\lambda_{Bragg}$ is an integer multiple of $\Delta f$ (equation (3)) is also reflected. For coupling with backward cladding-mode light, the light is reflected in both the core region 11 and the inner cladding region 12 in which index modulations are formed. Accordingly, light radiation from the core region 11 to the outer cladding region 13 is reduced.

On the other hand, for coupling with forward cladding-mode light, mode conversion is suppressed, as described above. Hence, light radiation from the core region 11 to the outer cladding region 13 is reduced.

In the diffraction grating device 1 according to this embodiment, in each region $A_n$ (n=1 to N), the ratio of the difference in index change amount between the core region 11 and the inner cladding region 12 due to index modulation formation to the index change amount of the core region 11 is preferably 12.5% or less. More specifically, the difference between the refractive index in the core region 11 in the regions $A_n$ (n=1 to N) and that in the core region 11 in the remaining regions $B_n$ (n=1 to N−1) is defined as a core index difference. In addition, the difference between the refractive index in the inner cladding region 12 in the regions $A_n$ (n=1 to N) and that in the inner cladding region 12 in the remaining regions $B_n$ (n=1 to N−1) is defined as an inner cladding index difference. At this time, the ratio of the difference between the core index difference and the inner cladding index difference to the core index difference is preferably 12.5% or less. With this arrangement, coupling with another mode can be suppressed to 5% or less, as compared to a single-mode fiber.

The ratio is more preferably 10% or less, and more preferably, 5% or less. In this case, coupling with another mode can be suppressed to 3% or less, or 1% or less, as compared to a single-mode case.

In the diffraction grating device 1 according to this embodiment, the radial size $r_{c1}$ of the inner cladding region 12 is preferably 16 µm or more.

A coupling coefficient representing mode conversion from the fundamental mode to another mode is proportional to the deviation from the initial value of the overlap integral of the field distribution of the fundamental mode that propagates through the core region.

Hence, when an absolute value α of the difference of the overlap integral, which is given by equation (1) below, before and after index modulation formation is obtained, the degree of coupling between the fundamental mode and another mode due to index modulation formation can be known.

$$\alpha = |\int E^+{}_{Cb}(r)E_{Ca}(r)dS - \int E^+{}_{Cb}(r)E_{Cb}(r)dS| \qquad (1)$$

where $E_{Ca}(r)$ is the field distribution of the fundamental mode that propagates through the core region after the refractive indices in the core and cladding regions are increased, $E_{Cb}(r)$ is the field distribution of the fundamental mode that propagates through the core region before the refractive indices in the core and cladding regions are increased, and $E^+{}_{Cb}(r)$ is the complex conjugate to $E_{Cb}(r)$.

Let $\Delta n_c$ be the change amount of the refractive index in the core region 11 due to index modulation formation, and $\Delta n_{c1}$ be the change amount of the refractive index in the inner cladding region 12. The index change amount difference δ Δn given by $\Delta n_{c1} - \Delta n_c$ was changed to various values, and the relationship between the index change amount difference δ Δn and the absolute value α of the difference of the overlap integral was checked.

Figure 3:
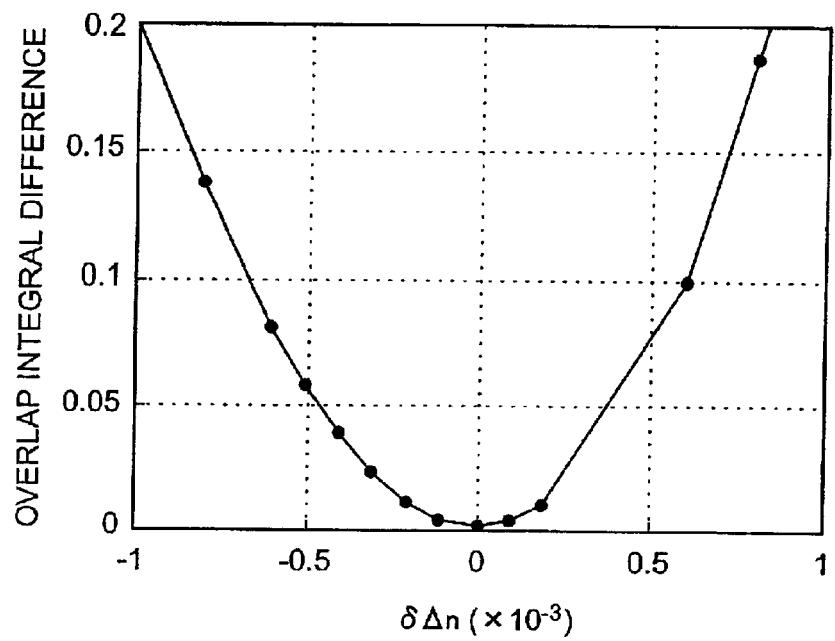
FIG. 3 is a graph showing the relationship between an index change amount difference δ Δn and an overlap integral difference when the change amount $\Delta n_c$ of the refractive index in the core region is $2\times10^{-3}$.
Figure 4:
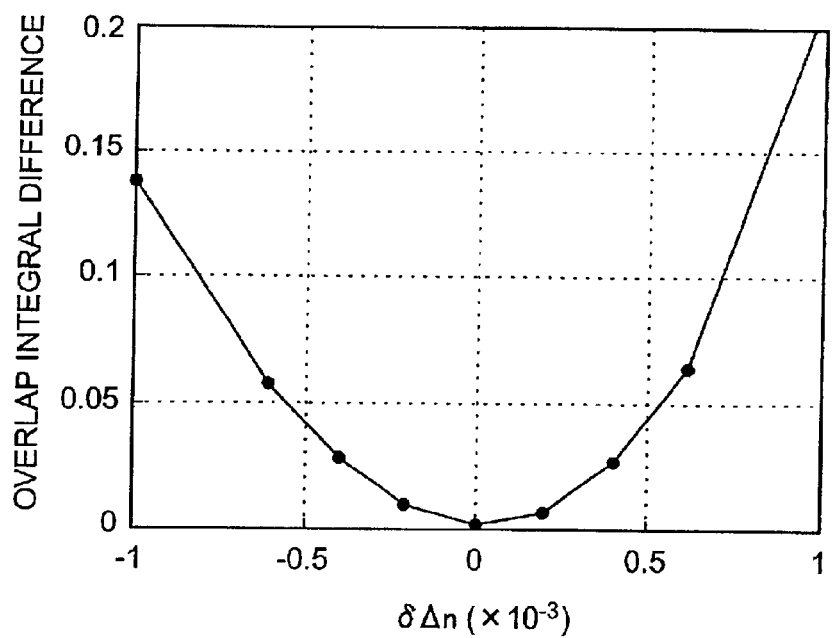
FIG. 4 is a graph showing the relationship between the index change amount difference δ Δn and the overlap integral difference when the change amount $\Delta n_c$ of the refractive index in the core region is $4\times10^{-3}$.

FIGS. 3 and 4 are graphs showing the relationships between the index change amount difference δ Δn and the absolute value α of the difference of the overlap integral when the change amount $\Delta n_c$ of the refractive index in the core region 11 was $2 \times 10^{-3}$ and $4 \times 10^{-3}$ respectively. In calculating the absolute value α, the radial size $r_{c1}$ of the inner cladding region 12 was set to 16 µm. Referring to FIGS. 3 and 4, the ordinate was normalized by an absolute value β of the difference of the overlap integral, which is given by equation (2) below, before and after index modulation formation when the refractive index in the core region of a standard single-mode fiber was changed in the same amount.

$$\beta = |\int E^{S+}{}_{Cb}(r)E^S{}_{Ca}(r)dS - \int E^{S+}{}_{Cb}(r)E^S{}_{Cb}(r)dS| \qquad (2)$$

where $E^S{}_{Ca}(r)$ is the field distribution of the fundamental mode that propagates through the core region after the refractive index in the core region is increased, $E^S{}_{Cb}(r)$ is the field distribution of the fundamental mode that propagates through the core region before the refractive index in the core region is increased, and $E^{S+}{}_{Cb}(r)$ is the complex conjugate to $E^S{}_{Cb}(r)$.

As shown in FIGS. 3 and 4, when the core region and the cladding region has no index change amount difference (δ Δn=0), the overlap integral rarely changes before and after index modulation formation. For this reason, conversion from the fundamental mode to another mode rarely occurs, and any loss can be suppressed. When the difference of overlap integral is suppressed to 5% or less, coupling with another mode can be suppressed to 5% or less, as compared to the single-mode fiber. To suppress the overlap integral difference to 5% or less, when the change amount $\Delta n_c$ of the refractive index in the core region 11 is $2 \times 10^{-3}$, the index change amount difference δ Δn is suppressed to $4 \times 10^{-4}$ or less, and when the change amount $\Delta n_c$ is $4 \times 10^{-3}$, the index change amount difference δ Δn is suppressed to $5 \times 10^{-4}$ or less, as shown in FIGS. 3 and 4. That is, the ratio of the index change amount difference δ Δn to the change amount $\Delta n_c$ of the refractive index in the core region 11 is suppressed to 12.5% or less.

The allowable range of the size of the inner cladding region 12 was checked next. Even when the size of the inner cladding region 12 is kept unchanged, the change in overlap integral becomes large as the index increase mount in the core region 11 increases. Hence, to check the allowable range of the radial size of the inner cladding region, it is only necessary to consider a case wherein the index change amount in the core region 11 and inner cladding region 12 is $4 \times 10^{-3}$.

Figure 5:
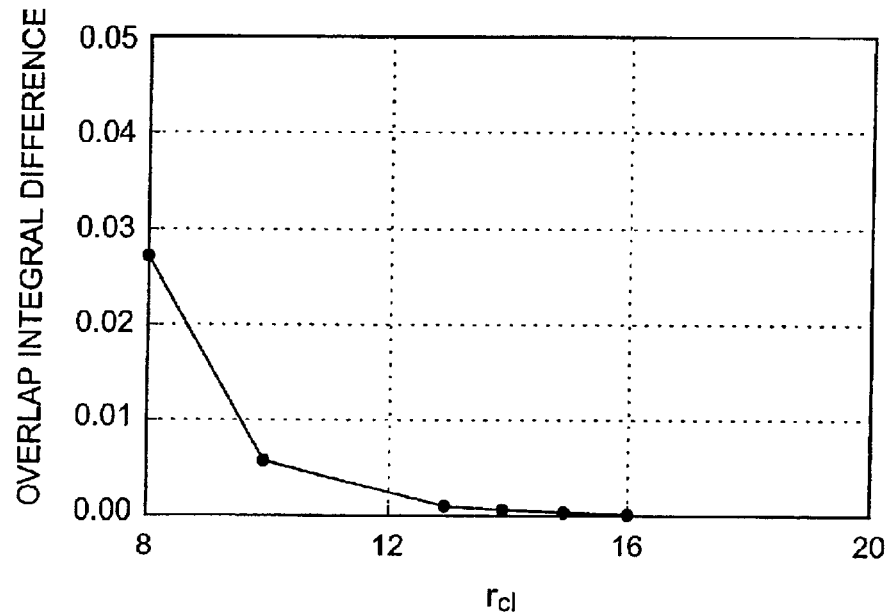
FIG. 5 is a graph showing a change in overlap integral difference when change amounts $\Delta n_c$ and $\Delta n_{c1}$ of the refractive indices in the core and cladding regions are $4\times10^{-3}$, and the size $r_{c1}$ of the inner cladding region is changed.
Figure 6:
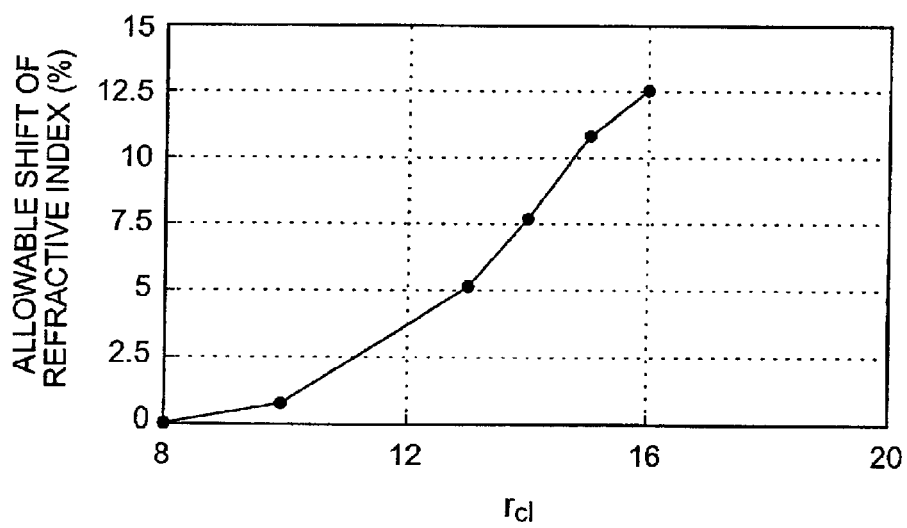
FIG. 6 is a graph showing the relationship between the allowable index change amount difference (shift of refractive index) δ Δn and the size $r_{c1}$ of the inner cladding region when the allowable value of the overlap integral difference is 5% or less.

When the size of the inner cladding region 12 is reduced, the overlap integral difference changes before and after index modulation formation. As is apparent from FIG. 5, as the size $r_{c1}$ of the inner cladding region 12 decreases from 16 µm, the difference α of the overlap integral increases even when δ Δn=0. However, when the allowable value of the overlap integral difference is 5% or less, the range surrounded by the curve and $r_{c1}$ axis shown in FIG. 6 is the allowable range. When the size $r_{c1}$ is larger than 16 μm, the allowable deviation of the refractive index is not less than 12.5%. For this reason, even when the size $r_{c1}$ is larger than 16 μm, the allowable range (surrounded by the curve and $r_{c1}$ axis) is present, as is apparent.

As shown in FIGS. 3 and 4, when the above allowable value of the overlap integral difference is 3% or less, the allowable index change amount difference δ Δn is suppressed to $3 \times 10^{-4}$ or less when the change amount $\Delta n_c$ of the refractive index in the core region 11 is $2 \times 10^{-3}$, or $4 \times 10^{-4}$ or less when the change amount $\Delta n_c$ is $4 \times 10^{-3}$. That is, the ratio of the index change amount difference δ Δn to the change amount $\Delta n_c$ of the refractive index in the core region 11 is suppressed to 10% or less.

When the above allowable value of the overlap integral difference is 1% or less, the allowable index change amount difference δ Δn is suppressed to $1 \times 10^{-4}$ or less when the change amount $\Delta n_c$ of the refractive index in the core region 11 is $2 \times 10^{-3}$, or $2 \times 10^{-3}$ or less when the change amount $\Delta n_c$ is $4 \times 10^{-3}$. That is, the ratio of the index change amount difference δ Δn to the change amount $\Delta n_c$ of the refractive index in the core region 11 is suppressed to 5% or less.

Figure 7:
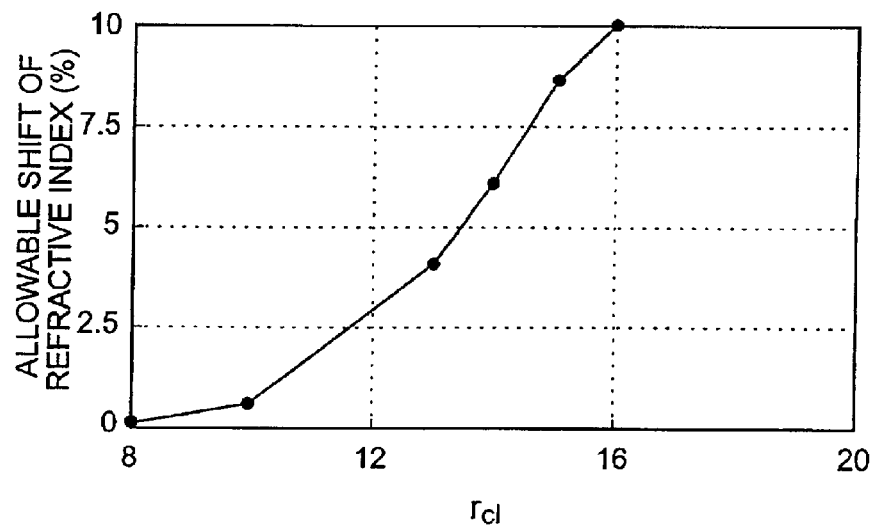
FIG. 7 is a graph showing the relationship between the allowable index change amount difference (shift of refractive index) δ Δn and the size $r_{c1}$ of the inner cladding region when the allowable value of the overlap integral difference is 3% or less.
Figure 8:
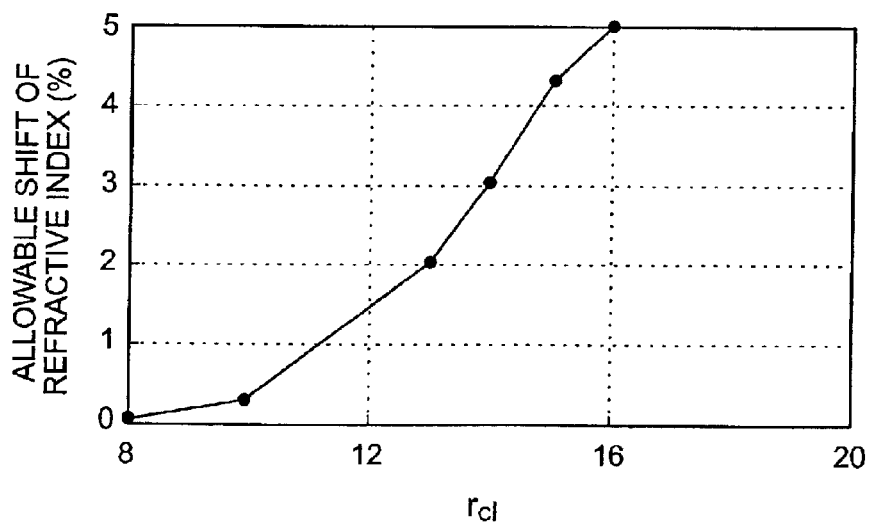
FIG. 8 is a graph showing the relationship between the allowable index change amount difference (shift of refractive index) δ Δn and the size $r_{c1}$ of the inner cladding region when the allowable value of the overlap integral difference is 1% or less.

FIGS. 7 and 8 are graphs showing the relationship between the allowable index change amount difference δ Δn and the size $r_{c1}$ of the inner cladding region 12 when the allowable value of the overlap integral difference is 3% or less and 1% or less respectively. When the overlap integral difference is 3% or less or 1% or less, the range surrounded by the curve and $r_{c1}$ axis shown in FIGS. 7 and 8 is the allowable range. When the size $r_{c1}$ is larger than 16 μm, the allowable deviation of the refractive index is not less than 10% in FIG. 7 or 5% in FIG. 8. For this reason, even when the size $r_{c1}$ is larger than 16 μm, the allowable range (surrounded by the curve and $r_{c1}$ axis) is present, as is apparent.

Figure 9:
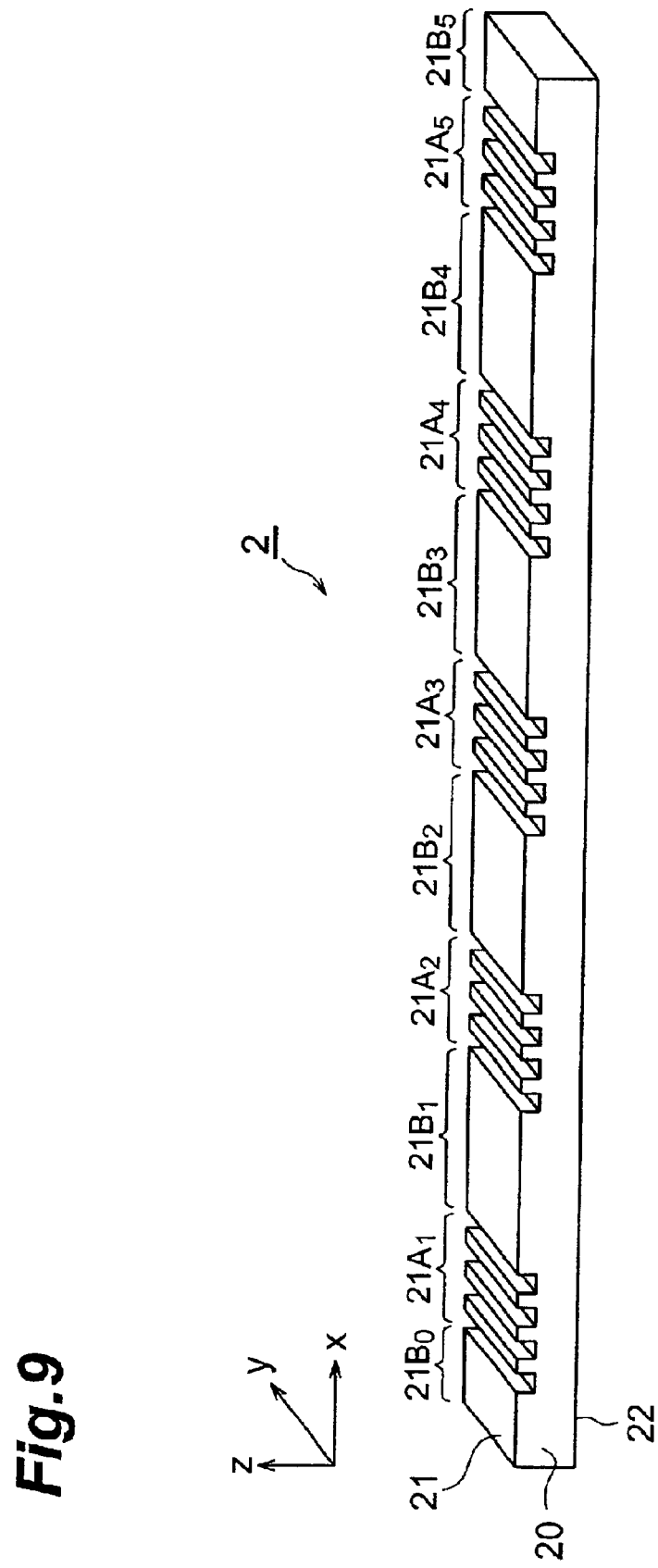
FIG. 9 is a perspective view of a phase grating mask used in manufacturing the diffraction grating device according to this embodiment.

A method of manufacturing the diffraction grating device 1 according to this embodiment will be described next. FIG. 9 is a perspective view of a phase grating mask 2 used in manufacturing the diffraction grating device 1 according to this embodiment. FIG. 10A is a side view of the phase grating mask 2. FIG. 10B is an enlarged view of part of a first surface 21 of the phase grating mask 2.

In the phase grating mask 2, phase gratings are formed in N regions $21A_n$ (n=1 to N) separated from each other on the first surface 21 of a flat plate 20 made of silica glass. More specifically, the direction of thickness of the silica glass flat plate 20 is defined as the Z-axis direction, and directions parallel to the sides of the silica glass flat plate 20, which are perpendicular to the Z-axis, are defined as the X- and Y-axis directions. On the first surface 21 of the silica glass flat plate 20, the regions $21A_n$ (n=1 to N) having phase gratings and flat regions $21B_n$ (n=0 to N) without any phase gratings alternate in the X-axis direction. In each region $21A_n$ (n=1 to N), the thickness in the Z-axis direction changes in the X-axis direction at a period $2L_g$, thus forming a phase grating. The phase grating mask 2 can be formed using photolithography. A second surface 22 of the silica glass flat plate 20 is flat.

The diffraction efficiency in the phase grating formed in each region $21A_n$ (n=1 to N) may be constant independently of the position or change depending on the position. In the latter case, the amplitude of index modulations in the diffraction grating device 1 manufactured using the phase grating mask 2 changes depending on the position. This diffraction grating device can exhibit an excellent reflection characteristic. The flat regions $21B_n$ (n=0 to N) without any phase grating may pass light (index change inducing light) having a wavelength that induces a change in refractive index in each of the core region 11 and inner cladding region 12 of the optical fiber 10, though they may have a light-shielding film to prevent transmission of the index change inducing light.

FIG. 11 is an explanatory view of a method of manufacturing the diffraction grating device 1 according to this embodiment. In this manufacturing method, the diffraction grating device 1 is manufactured using the above-described phase grating mask 2. In this manufacturing method, the above-described phase grating mask 2 and optical fiber 10 are prepared first. The phase grating mask 2 is placed aside the optical fiber 10. The optical fiber 10 is arranged almost in tight contact with the first surface 21 of the phase grating mask 2 such that the optical axis of the optical fiber 10 is parallel to the X-axis. Next, the N regions $21A_n$ (n=1 to N) of the phase grating mask 2, where the phase gratings are formed, are simultaneously irradiated with index change inducing light (e.g., a UV laser beam with a wavelength of 248 nm, which is output from a KrF excimer laser source) from the second surface 22 side of the phase grating mask 2. With this irradiation, index modulations are formed in both the core region 11 and the inner cladding region 12 along the longitudinal direction in the regions $A_n$ (n=1 to N) of the optical fiber 10 arranged almost in tight contact with the regions $21A_n$ (n=1 to N) of the phase grating mask 2.

An example and comparative example of the diffraction grating device 1 according to this embodiment will be described next. The diffraction grating device of the example has the above-described arrangement. On the other hand, the diffraction grating device of the comparative example has index modulations formed in only its core region and no index modulations in regions other than the core region. In the example and comparative example, the sampling period $L_s$ was 1.03 mm, the width $W_A$ was 0.1 mm, and the total length $((N-1)·L_s+W_A)$ was 100 mm. In the example and comparative example, additionally, the longitudinal change rate of the period $L_g$ of index modulations was set to 0.013 nm/cm to implement a dispersion compensating function.

Figure 12A:
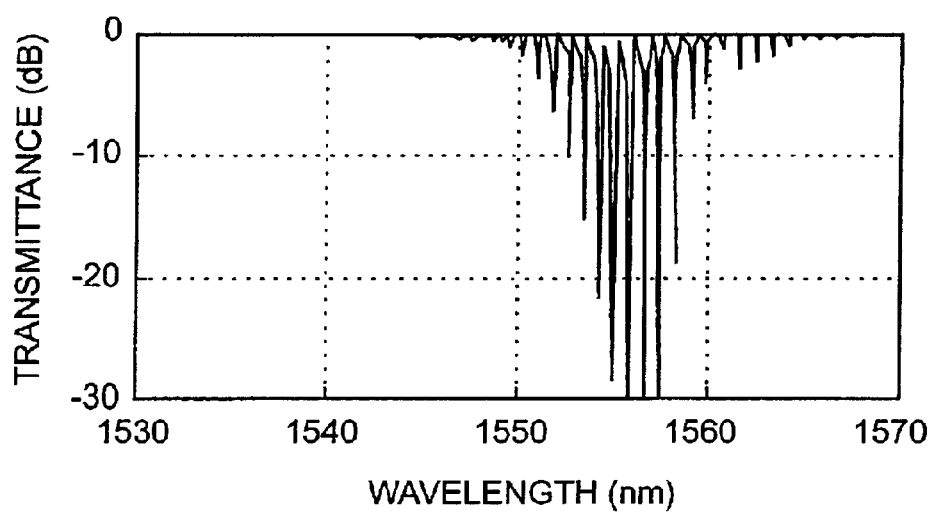
FIGS. 12A and 12B are graphs showing the transmission characteristics of diffraction grating devices of an example and comparative example respectively.
Figure 12B:
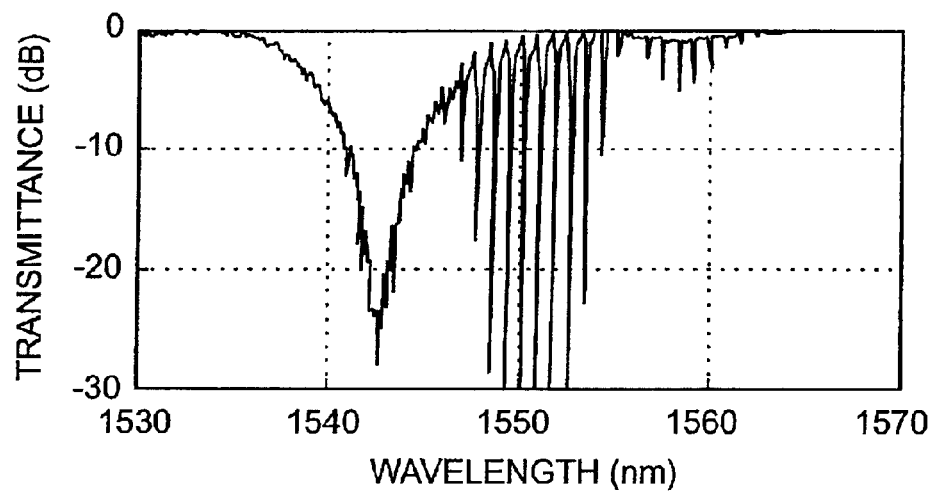

FIGS. 12A and 12B are graphs showing the transmission characteristics of the diffraction grating devices of the example and comparative example. FIG. 12A shows the transmission characteristic of the diffraction grating device of the example. FIG. 12B shows the transmission characteristic of the diffraction grating device of the comparative example. As shown in FIG. 12B, in the diffraction grating device of the comparative example, the radiation mode loss and the transmission loss due to intermode optical coupling appeared at their peak near 1,542 nm. The peak value was as large as 28 dB. When the outer surface of the diffraction grating device of this comparative example was covered with a resin, the transmission loss due to intermode optical coupling was reduced, though a radiation mode loss of about 1 to 2 dB remained. To the contrary, as shown in FIG. 12A, in the diffraction grating device of the example, the radiation mode loss and the transmission loss due to intermode optical coupling were very small. When its outer surface was covered with a resin, these losses further decreased.

As has been described above in detail, in the diffraction grating device according to this embodiment, the diffraction grating device has the core region, inner cladding region, and outer cladding region sequentially from the optical axis center. Index modulations are formed in both the core region and the inner cladding region of the optical waveguide in each of a plurality of regions separated from each other in the longitudinal direction of the optical waveguide.

Hence, out of core-mode light that is guided through the optical waveguide to reach a region $A_n$ where index modulations are formed, a core-mode light component having a specific wavelength that satisfies the Bragg condition is Bragg-reflected. In addition, a cladding-mode light component having a wavelength whose frequency difference from that wavelength is an integer multiple of a predetermined value is also reflected. For coupling with backward cladding-mode light, the light is reflected in both the core region and the inner cladding region in which index modulations are formed. Accordingly, light radiation from the core region to the outer cladding region is reduced. On the other hand, for coupling with forward cladding-mode light, mode conversion is suppressed because a change in index difference between the core region and the inner cladding region is suppressed in the regions with the index modulations and the remaining regions. For this reason, light radiation from the core region to the outer cladding region is reduced.

As is apparent from the above description of the present invention, various changes and modifications can be made without departing from the spirit and scope of the invention, and any improvement obvious to those skilled in the art is incorporated in the appended claims.

What is claimed is:

1. A diffraction grating device in which index modulations are formed along a longitudinal direction of an optical waveguide, wherein the optical waveguide has a core region, an inner cladding region, and an outer cladding region sequentially from an optical axis center, and index modulations capable of Bragg-reflecting a light component having a predetermined wavelength out of propagated light in the opposite direction are formed in both the core region and the inner cladding region of the optical waveguide in each of a plurality of regions separated from each other along the longitudinal direction of the optical waveguide.

2. A diffraction grating device in which index modulations are formed along a longitudinal direction of an optical waveguide, wherein the optical waveguide has a core region, an inner cladding region, and an outer cladding region sequentially from an optical axis center, index modulations capable of Bragg-reflecting a light component having a predetermined wavelength out of propagated light in the opposite direction are formed in both the core region and the inner cladding region of the optical waveguide in each of a plurality of regions separated from each other along the longitudinal direction of the optical waveguide, and in each of the plurality of regions, a ratio ($|\delta \Delta n|/\Delta n_c$) of a difference ($|\delta \Delta n|=|\Delta n_{ci}-\Delta n_c|$) between a change amount ($\Delta n_c$) of a refractive index in the core region and a change amount ($\Delta n_{ci}$) of a refractive index in the inner cladding region due to formation of the index modulations to the change amount ($\Delta n_c$) of the refractive index in the core region is not more than 0.125.

3. A device according to claim 2, wherein the ratio is not more than 0.1.

4. A device according to claim 2, wherein the ratio is not more than 0.05.

5. A diffraction grating device in which index modulations are formed along a longitudinal direction of an optical waveguide, wherein the optical waveguide has a core region, an inner cladding region, and an outer cladding region sequentially from an optical axis center, index modulations capable of Bragg-reflecting a light component having a predetermined wavelength out of propagated light in the opposite direction are formed in both the core region and the inner cladding region of the optical waveguide in each of a plurality of regions separated from each other along the longitudinal direction of the optical waveguide, and when a difference between a refractive index in the core region in the plurality of regions and a refractive index in the core region outside the plurality of regions is defined as a core index difference, and a difference between a refractive index in the inner cladding region in the plurality of regions and a refractive index in the inner cladding region outside the plurality of regions is defined as an inner cladding index difference, a ratio ($|\delta \Delta n|/\Delta n_c$) of a difference ($|\delta \Delta n|=|\Delta n_{ci}-\Delta n_c|$) between the core index difference and the inner cladding index difference ($\Delta n_{ci}$) to the core index difference ($\Delta n_c$) is not more than 0.125.

6. A device according to claim 5, wherein the ratio is not more than 0.1.

7. A device according to claim 5, wherein the ratio is not more than 0.05.

8. A device according to claim 1, wherein a radial size of the inner cladding region is not less than 16 $\mu$m.

* * * * *